United States Patent
Churchill et al.

(10) Patent No.: US 7,446,892 B1
(45) Date of Patent: Nov. 4, 2008

(54) ELECTRONIC DOCUMENT IMAGING AND DELIVERY SYSTEM AND METHOD

(75) Inventors: Cheryl Ann Churchill, Rogers, MN (US); Debra Young Jones, Shoreview, MN (US); Prabhu Arokiaswamy, Maple Grove, MN (US); Glenda Carol Swinford, Minneapolis, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 788 days.

(21) Appl. No.: 10/904,668

(22) Filed: Nov. 22, 2004

Related U.S. Application Data (60) Provisional application No. 60/564,727, filed on Apr. 23, 2004.

(51) Int. Cl.
*G06K 9/00* (2006.01)
(52) U.S. Cl. ...................... 358/1.15; 358/402; 382/139; 382/306
(58) Field of Classification Search .................. 358/402, 358/403, 496, 498, 1.15, 474; 379/100.08; 399/369, 361; 235/462.01, 462.1, 462.24, 235/462.25; 382/137, 139, 305, 306
See application file for complete search history.

(56) References Cited

U.S. PATENT DOCUMENTS

| | | | | |
|---|---|---|---|---|
| 4,264,808 | A * | 4/1981 | Owens et al. | 705/30 |
| 6,631,495 | B2 * | 10/2003 | Kato et al. | 715/255 |
| 6,633,893 | B2 * | 10/2003 | Yahara et al. | 707/205 |
| 6,775,422 | B1 * | 8/2004 | Altman | 382/305 |
| 6,938,202 | B1 * | 8/2005 | Matsubayashi et al. | 715/234 |
| 2003/0074411 | A1 * | 4/2003 | Nale | 709/206 |
| 2004/0046997 | A1 * | 3/2004 | Tsai | 358/1.15 |
| 2004/0099580 | A1 * | 5/2004 | Brotherston et al. | 209/583 |
| 2004/0111297 | A1 * | 6/2004 | Schoenberg | 705/3 |
| 2004/0178128 | A1 * | 9/2004 | O'Connell et al. | 209/584 |

OTHER PUBLICATIONS

"IBML Introduces New ImageTrac III and ImageTrac IV Document Scanners", IBML, Feb. 26, 2004.*
Ramsaran, "What's up, docs? (bank document management)", Mar. 2004, CMP Media Inc, USA, Bank Systems+ Technology, vol. 41, No. 3, p. 30-33.*

\* cited by examiner

*Primary Examiner*—Kimberly A Williams
(74) *Attorney, Agent, or Firm*—Snell & Wilmer L.L.P.

(57) ABSTRACT

The present invention provides systems and methods for facilitating document imaging and delivery. A scanner reads a barcode from a separator sheet associated with a document, sorts the document based on the barcode, and scans the document in order to create an electronic document. A first server reads a document form number from the electronic document and assigns a document control number to the electronic document. A second server determines the document type and identification information associated with the electronic document based on the document form number. The second server indexes the electronic document using the barcode, the document form number, the document control number, identification information, or the document type. The second server routes the location of the electronic document to a computer system based on the barcode, the document form number, the document control number, identification information, or the document type.

16 Claims, 3 Drawing Sheets

ELECTRONIC DOCUMENT IMAGING AND DELIVERY SYSTEM AND METHOD

CROSS REFERENCE TO RELATED APPLICATIONS

This application claims priority to and the benefit of U.S. Provisional Patent Application Ser. No. 60/564,727, entitled "Digital Mailroom System and Method", and filed Apr. 23, 2004; the entire contents of which is hereby incorporated by reference.

FIELD OF INVENTION

The present invention relates generally to electronic document imaging and delivery and, more particularly, to electronic document scanning and configuration for high speed electronic document delivery.

BACKGROUND OF INVENTION

Few mail rooms typically include, for example, outsourcing of mail imaging to transform printed mail into usable images for streamlined processing. Unfortunately, the processes employed by the outsourcing agency are often slow (e.g., scanning only 25 pages per minute) and highly dependent upon manual paper processes. For example, manual paper processes that support an image operation often include front-end sorting, prepping, scanning, indexing, and additional backend sorting and document extraction. Moreover, the high volume of documents, the significant variation in the number of document or form types (e.g., more than 700), and the potential combinations of varied documents within a batch of documents usually contribute to the complexity of mail imaging and delivery. Unacceptable error rates, delays, and poor data accuracy further complicate the process of mail imaging and delivery.

In view of the foregoing, a need exists for systems and methods which facilitate electronic document scanning and configuration for high speed electronic document delivery. More specifically, a need exists for systems and methods that require little or no front-end and back-end processing of documents and flexibility in handling many document types.

SUMMARY OF INVENTION

The invention includes systems and methods for facilitating electronic document scanning and configuration for high speed electronic document delivery. In accordance with an exemplary embodiment of the present invention, a scanner reads a barcode from a separator sheet associated with a document, sorts the document based on the barcode, and scans the document in order to create an electronic document. The scanner can determine whether there is more than one level of a separator sheet for the document and whether the electronic document is a trace coupon, a check, or a critical extraction document. The scanner can also capture the Magnetic Ink Character Recognition (MICR) data if the electronic document is a trace coupon or a check and enhance the image quality of the electronic document. The scanner communicates with a first server.

The first server reads a document form number, a document control number, or identification information from the electronic document and assigns a document form number, a document control number, or identification information to the electronic document. The first server stores the electronic document in one or more databases. The scanner and the first server communicate with a second server.

The second server determines the document type and identification information associated with the electronic document based on the barcode, the document form number, the document control number, or identification information. The second server reads the document form number and translates the document form number into a document type.

The second server indexes the electronic document using the barcode, the document form number, the document control number, identification information, or the document type. The second server captures' the MICR data if the electronic document is a trace coupon or a check. The second server can also enhance the image quality of the electronic document and store the electronic document in one or more databases. The second server routes the electronic document to a computer system based on the barcode, the document form number, the document control number, identification information, or the document type. The scanner, first server, second server, and computer system communicate via a communication channel.

The communication channel makes available the location of the electronic document electronically to the computer system based on the barcode, the document form number, the document control number, identification information, or the document type. The computer system locates and can access the electronic document using a Uniform Resource Locator associated with the electronic document.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and wherein:

DETAILED DESCRIPTION

The following disclosure presents and describes various exemplary embodiments in sufficient detail to enable those skilled in the art to practice the invention, and it should be understood that other embodiments may be realized without departing from the spirit and scope of the invention. Thus, the following detailed description is presented for purposes of illustration only and not of limitation.

Systems and methods in accordance with various aspects of the invention facilitate electronic document scanning and configuration for high speed electronic document delivery. The invention is applicable to many diverse areas to facilitate electronic document scanning and configuration for high speed electronic document delivery. In an exemplary embodiment, a system and method are provided to facilitate configuring, scanning, sorting, enhancing image quality, and/or delivering documents electronically to a user. Electronic delivery of documents is independent of the location of the document, which enables delivery of documents anywhere in the world. For example, various documents may include incoming mail, interdepartmental mail, and documents to be processed (e.g., checks, accounts payable, and the like). Thus, the present invention facilitates electronic document scanning, configuration, and delivery of a wide variety of document types.

The particular implementations shown and described illustrate the invention and its best mode and are not intended to otherwise limit the scope of the present invention in any way. Furthermore, the connecting lines shown in the various figures are intended to represent exemplary functional relationships and/or physical couplings between the various elements. It should be noted that many alternative or additional functional relationships or physical connections may be present in a practical implementation of the invention.

The present invention is described in terms of functional block components and various processing steps. As will be appreciated, the present invention may be embodied as a method, a data processing system, a device for data processing, and/or a computer program product. Such functional blocks may be realized by any number of hardware and/or software components configured to perform the specified functions. Accordingly, aspects of the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, JAVA™, COBOL, OBJECT REXX™, assembler, PERL, eXtensible Markup Language (XML), or the like, with the various algorithms being implemented on various platforms (e.g., OS/390, z/OS, SUN™ SOLARIS™, MICROSOFT™ WINDOWS™, UNIX, and the like) with any combination of data structures, objects, processes, routines, or other programming elements. Further, it should be noted that the present invention may employ any number of conventional techniques for data transmission, signaling, data processing, network control, and the like.

Figure 1:
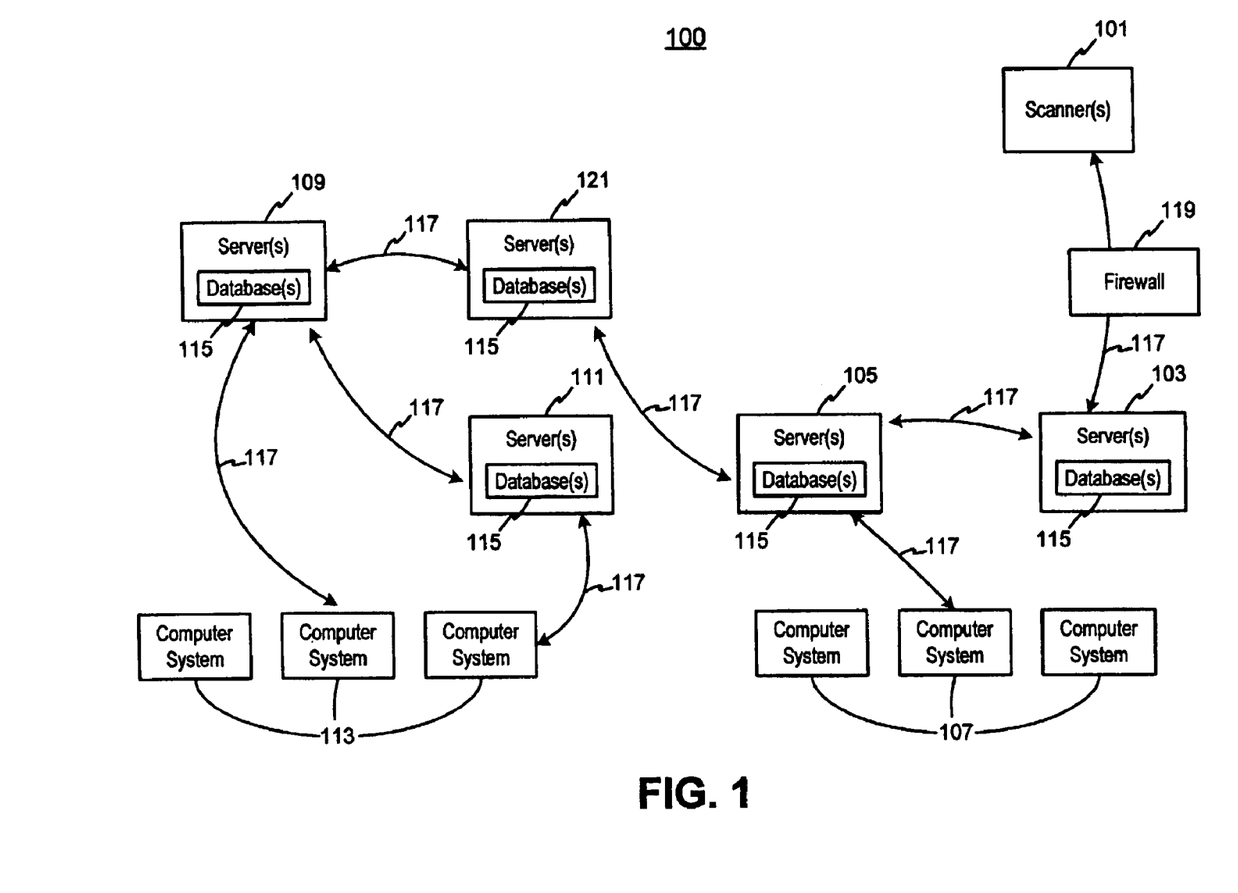
FIG. 1 is a block diagram of a system for electronic document scanning and configuration for high speed electronic document delivery in accordance with an exemplary embodiment.

FIG. 1 is a block diagram of a system 100 for facilitating electronic imaging, configuration, and delivery of documents in accordance with an exemplary embodiment. System 100 may include one or more scanners 101, one or more servers 103, one or more servers 105, one or more servers 109, one or more servers 111, one or more servers 121, one or more computer systems 107, and one or more computer systems 113. The various servers of system 100 may include one or more databases 115. The various elements of system 100 are configured to communicate through one or more communication channels 117.

If a company has offices in many locations (e.g., different cities, states, or countries), electronic document delivery is desirable for faster document delivery. System 100 facilitates the imaging, configuration, and delivery of documents by delivering the location of incoming documents electronically to a user's computer system 113. For example, system 100 may be implemented for incoming mail, which may be distributed to various departments within a company. The mail may include, for example, handwritten materials (e.g., checks or other financial documents) and time-sensitive data that should be captured quickly and with complete accuracy. System 100 provides a high degree of accuracy by capturing, classifying, and delivering such various documents. System 100 is adaptable to existing backend information systems, yet is scalable enough to expand capacity to accommodate many entities.

In an exemplary embodiment, one or more documents are prepared to be scanned into scanner 101. Documents are prepared based on various characteristics, such as, for example, document form number, document type, document destination, document identifier, or other relevant information. This type of document preparation can be done manually (e.g., by a person), by an automated system (e.g., a conveyer belt, robot, optical character recognition, and computer system), or a combination of manual and automated preparation. Based on the document characteristics, each document can be associated with a separator sheet.

In an exemplary embodiment, the following separator sheets have an associated barcode as follows:
  client folder separator sheet (barcode is FOLDER);
  document separator sheet (barcode is DOCUMENT);
  payment separator sheet (barcode is PAYMENT);
  trace document separator sheet (barcode is TD (0-9) (0-9) (0-9) (0-9) (0-9) (0-9) (0-9) (0-9) (0-9) (0-9) (0-9) (0-9));
  critical extraction document separator sheet (barcode is CEDOCUMENT);
  critical extraction (CE) placeholder separator sheet (barcode is PLACEHOLDER);
  RESCAN separator sheet (barcode is RESCAN); and
  back-end (BE) archive separator sheet (barcode is ARCHIVE).

There can be any number of separator sheets with various associated barcodes depending on the needs of system 100, so that system 100 is not limited to the above exemplary embodiment. Scanner 101 reads the barcode and document form number from the separator sheet or the document in order to customize the scanning of the document. Reading the barcode on the separator sheet allows scanner 101 to define the beginning of a new set of documents (client separator), a new document (document separator), a critically extracted document (critical extraction document separator), etc. For example, one or more documents may be associated with a client folder, and the documents and client folder may be associated with a barcode. The client folder can use multiple separator sheets with multiple barcodes, and can be for one client, various clients, or otherwise configured depending on the needs of system 100. The information from the barcode and separator sheet may further be used in system 100, as explained below.

Scanner 101 sorts the documents based on the barcode (e.g., one or more documents). Scanner 101 identifies and sorts the documents into various pockets (not shown) of scanner 101 based on one or more of the barcode, a document form number, a document control number, identification information, and a document type. For example, a check may be identified and sent manually and/or electronically to a payment processor area (e.g., accounts receivable) or a time-sensitive document may be identified and sent manually and/or electronically to the proper area (e.g., specific department within a company).

One or more of scanner 101 and server 105 creates and assigns a document control number to the document. One or more of scanner 101 and server 105 can "spray" a document control number onto the document. The document control number is a unique document identifier, which is discussed in more detail below.

Scanner 101 scans the document in order to generate an electronic document. Scanning one or more documents may result in one or more electronic documents depending on how the documents are prepared for scanning. Scanner 101 performs preprocessing, image enhancement, and data capture associated with the electronic document. For example, scanner 101 can determine whether there is more than one level of a separator sheet for the document, and whether the electronic document is a trace coupon, a check, or a critical extraction document. Scanner 101 can capture the MICR data if the electronic document is a trace coupon or a check.

In one exemplary embodiment, scanner 101 may be one or more high-speed scanners from Imaging Business Machines LLC (IBML) of Birmingham, Ala., such as an IBML Image Trac II scanner, an IBML Image Trac III scanner, or an IBML Image Trac IV scanner, along with IBML's SoftTrac® scanner application interface software. These scanners reduce or substantially eliminate most of the manual handling of documents and increase accuracy, throughput, and productivity in document delivery. Such a scanner may scan, for example, about 3,000 documents per hour at a rate of about 190 pages per minute. This type of scanner has several unique pockets for holding various documents. System 100 reduces manual processing on various levels, which dramatically reduces opportunities for error and increases data accuracy. System 100 allows a company, for example, to process more documents with less people, thereby reducing the number of full-time employees needed to complete processing (e.g., from 90 to 45 employees).

Server 103 imports the electronic document from scanner 101 via an optional firewall 119. Server 105 polls the electronic document from server 103. Server 103 is optional, so that scanner 101 can place the electronic document directly onto server 105.

Using control logic (not shown), server 105 performs preprocessing, image enhancement, and data capture associated with the electronic document. For example, in one embodiment, server 105 may utilize control logic (e.g., Captiva's FormWare™ software) to poll the electronic document from server 103, enhance the electronic document, and read various information from the electronic document. Server 105 assigns and/or reads one or more of the barcode, a document form number, a document control number, and identification information to/from the electronic document (e.g., using optical character recognition (OCR)). Server 105 determines one or more of a document type and identification information of the electronic document based on at least one of the barcode, the document form number, the document control number, and identification information. Server 105 determines one or more of a document type and identification information by translating the barcode, document form number, document control number, identification information, or other document information into a document type. Translation of the barcode, document form number, document control number, identification information, or other document information into a document type may be facilitated using a look-up table. The document type can have a unique client identifier associated with that document type. For example, if a client's social security number or tax identification number are known, then the document may be associated with the client's social security number or tax identification number as the unique client identifier. Accordingly, the look-up table may be configured to translate the barcode, document form number, document control number, identification information, or other document information into a document type. More than one document form number can be associated with one document type.

This look-up table may further provide a dummy translation code for a document missing a document form number. The dummy translation code may flag the need to manually or automatically identify this particular document (e.g., via computer systems 107). In one exemplary embodiment, a person prompted by the dummy translation code reviews the electronic document and assigns a proper document type to the document. In another exemplary embodiment, a character recognition system may read at least portions of the document in order to identify the electronic document and assign a proper document type to the document.

If server 105 cannot determine the document type of the electronic document, server 105 transmits the electronic document to one or more computer systems 107 for further processing. One or more of server 105 and computer systems 107 index the unrecognized document type and read various document information, such as the barcode, document control number, document form number, client identifier, or other document information. Accordingly, indexing the electronic document includes using one or more of the barcode, the document form number, the document control number, identification information, and the document type. One or more of server 105 and computer systems 107 validate various document information, such as the barcode, document control number, document form number, or other document information. One or more of server 105 and computer systems 107 supplement the document information, so that the electronic document may be categorized. For example, if an electronic document is associated with a particular user or entity, a user identifier (e.g., client identifier, user identification number, social security number), entity identifier (e.g., tax identification number), or other information is associated with the electronic document in order to be able to categorize the document. Thus, even if server 105 cannot initially determine the document type, computer systems 107 may supply information for categorizing the document. Accordingly, once the document type is determined, the electronic document may be transmitted to at least one of servers 109, 111, 121. System 100 can increase indexing productivity, e.g., from about 45 seconds per document to an average of about 12 seconds.

Once server 105 transmits the electronic document to at least one of servers 109, 111, 121, then servers 109, 111, 121 further categorize the electronic document. For example, servers 109, 111, 121 may further sort the contents of the client folder by separating parts of the client folder. While numerous servers are disclosed, the invention contemplates one or all of the functions handled by one or more servers. In one exemplary embodiment, server 121 is configured as a hub for delivering information associated with the electronic document to server 109. Server 109 stores and archives the electronic document and awaits further information from server 121.

There could be a number of electronic documents associated with one client. Server 109 is capable of storing all the client folders associated with a client. Once server 109 has a complete client folder, server 109 forwards the electronic document location (e.g., a URL (Uniform Resource Locator)) to server 111. Computer systems 113 have access to the location of the electronic document and can access each electronic document. For example, each electronic document may be associated with a URL. Server 111 may determine which computer system 113 desires to access the electronic document or client folder and forward the location of the electronic document or folder to the proper computer system 113. Computer system 113 can access one or more of servers 109 or 111 to locate and access the electronic document using the location information (e.g., a URL). Accordingly, the URL points to a location on servers 109 or 111 in which computer systems 113 can locate and access the electronic document. One or more communication channels 117, in communication with one or more of scanner 101, server 105, and one or more computer systems 113, can deliver the location of the electronic document electronically to one or more computer systems 113 based on one or more of the barcode, the document form number, the document control number, identification information, and the document type. Computer system 113 may be a user's computer system, a group of users' computer systems, or any other configuration depending on the needs of system 100. Thus, system 100 facilitates electronic document scanning and configuration for high speed electronic document delivery worldwide.

While the embodiments may be described in the context of one electronic document, the invention contemplates multiple electronic documents or one or more client folders. In addition, to simplify the figure, a communication arrow is intentionally not illustrated between server 105 and servers 109 and 111. However, it is clear from the description that server 105 may transmit the electronic document to servers 109 and 111, similar to the illustration showing communication with server 121.

System 100 contemplates uses in association with web services, utility computing, pervasive and individualized computing, security and identity solutions, autonomic computing, commodity computing, mobility and wireless solutions, open source, biometrics, grid computing and/or mesh computing. System 100, as well as any of its component systems, include a server (e.g., servers 103, 105, 109, 111, 121) or other computing system (computer systems 107, 113), including a processor for processing digital data, a memory coupled to the processor for storing digital data, an input digitizer coupled to the processor for inputting digital data, an application program stored in the memory and accessible by the processor for directing the processing of digital data by the processor, a display coupled to the processor and memory for displaying information derived from digital data processed by the processor and a plurality of databases, the databases including client data, merchant data, financial institution data and/or like data that could be used in association with the present invention.

Computer systems 107 or 113 or servers 103, 105, 109, 111, 121 may be any computing unit, server, mainframe, or the like. Computer system 107 or 113 or servers 103, 105, 109, 111, 121 include any hardware and/or software suitably configured to store information, run complex routines and logic, and interact with the other components of system 100. Although a number of computer systems 107 or 113 or servers 103, 105, 109, 111, 121 are illustrated in FIG. 1, it will be appreciated that system 100 may include any number of computer systems 107 or 113 or servers 103, 105, 109, 111, 121 in communication with any number of databases 115 through any number of communication channels 117. In the exemplary embodiment, computer system 107 or 113 and database 115 are separate systems, which may be located in one location or remotely located from one another. In an alternate embodiment, database 115 may be integrated within computer system 107 or 113 or any of servers 103, 105, 109, 111, 121. In such an embodiment, an integrated system may be components of a single computing device (e.g., separate modules of a single computing unit) or may be separate components of an integrated computing system, wherein computer system 107 or 113, servers 103, 105, 109, 111, 121, and database 115 components communicate with each other via a network that is separate from communication channels 117.

Each participant or user of system 100, including customers, purchasers, merchants, card issuers, financial services companies, healthcare oriented companies, and third-parties, for example, may be equipped with a suitable computing system to facilitate communications and transactions with any other participant. For example, some or all participants may have access to a computing unit in the form of a personal computer, although other types of computing units may be used, including laptops, notebooks, handheld computers (e.g., a Palm Pilot®), set-top boxes, kiosk terminals, personal digital assistants, cellular phones, and the like. Additionally, participants may have computing systems which may be implemented in the form of a computer server, PC server, workstation, minicomputer, mainframe, a networked set of computers, or any other suitable implementations which are known in the art or may hereafter be devised. A participant's computing system may include any suitable operating system, such as any version of WINDOWS™, WINDOWS NT™, WINDOWS 2000™, WINDOWS 98, WINDOWS 95, MacOS, OS/2, OS/390, BeOS, Linux, UNIX, or the like. Further, although the invention may be described herein as being implemented with TCP/IP communications protocols, it will be readily understood that the invention could also be implemented using IPX (Internetwork Packet Exchange), APPLETALK, IP-6, NetBIOS (Network Basic Input/Output System), OSI (Open Systems Interconnection), or any number of existing or future protocols. Moreover, the system contemplates the use, sale, or distribution of any goods, services, or information over any network having functionality similar to that described herein.

One or more databases 115 and any other data storage devices referred to herein may include any type of hardware and/or software device, which is configured to store and maintain data. Exemplary devices include any suitable type of database, such as relational, hierarchical, object-oriented, and/or the like. Common database products that may be used to implement databases 115 and any other data storage devices referred to herein include DB2 by IBM (White Plains, N.Y.), any of the database products available from Oracle Corporation (Redwood Shores, Calif.), MICROSOFT ACCESS™ by Microsoft Corporation (Redmond, Wash.), or any other database product. One or more databases 115 and any other data storage devices referred to herein may be organized in any suitable manner including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the data tables. A "key field" partitions the database according to the high-level class of objects defined by the key field. For example, a certain class may be designated as a key field in both the first data table and the second data table, and the two data tables may then be merged on the basis of the class data in the key field.

In an exemplary embodiment, computer systems 107 or 113, servers 103, 105, 109, 111, 121, and database 115 may be suitably coupled to communication channels 117 via data links. A variety of conventional communications media and protocols may be used for data links, such as a connection to an Internet Service Provider (ISP) over a local loop, as is typically associated with standard modem communication, cable modem, Dish networks, ISDN (Integrated Services Digital Network), DSL (Digital Subscriber Line), or various wireless communication methods. Computer system 107 or 113, servers 103, 105, 109, 111, 121, and database 115 may each also reside within a LAN (Local Area Network), which interfaces to another network via a leased line (e.g., T1, D3, and/or the like). Such communication methods are well known in the art and are covered in a variety of standard texts. See, e.g., Gilbert Held, *Understanding Data Communications* (1996), which is hereby incorporated by reference.

Communication between participants in system 100 is accomplished through any suitable communication channel (e.g., communication channel 117), such as, for example, a telephone network, public switch telephone network, intranet, Internet, extranet, WAN (Wide Area Network), LAN, point of interaction device (e.g., point of sale device, personal digital assistant, cellular phone, kiosk terminal, automated teller machine (ATM), and/or the like), online communications, off-line communications, wireless communications, satellite communications, and/or the like. The network may also be implemented as other types of networks, such as an interactive television (ITV) network. It will be appreciated that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

The computing systems may be connected with each other via a data communications network. For example, the network may be a public network, which is assumed to be insecure and open to eavesdroppers. In one embodiment, the network is embodied as the Internet. In this context, the computers may or may not be connected to the Internet at all times. For instance, a user's computer may employ a modem to occasionally connect to the Internet, whereas a merchant computing system, a financial services company computing system, and/or a healthcare oriented company system's computing system might maintain a permanent connection to the Internet. Specific information related to the protocols, standards, and application software utilized associated with the Internet are not discussed herein. For further information regarding such details, see, for example, Dilip Naik, *Internet Standards and Protocols* (1998); *Java 2 Complete*, various authors (Sybex 1999); Deborah Ray and Eric Ray, *Mastering HTML* 4.0 (1997); and Loshin, *TCP/IP Clearly Explained* (1997). Each of these texts is hereby incorporated by reference.

Figure 2:
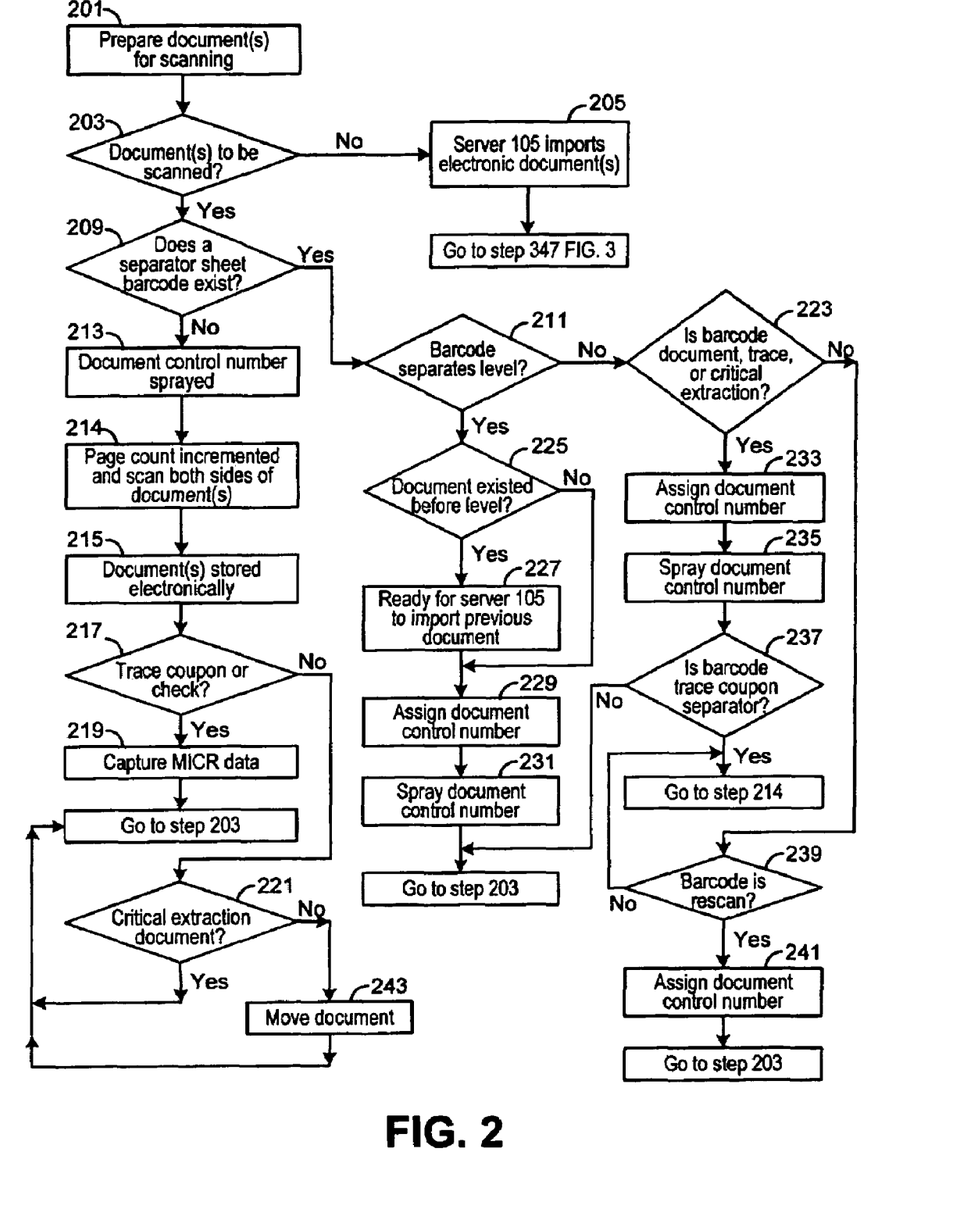
FIG. 2 is a flowchart of a method for electronic document scanning and configuration for high speed electronic document delivery in accordance with an exemplary embodiment.

FIG. 2 is a flowchart of a method for electronic document scanning and configuration for high speed electronic document delivery (e.g., for system 100 of FIG. 1) in accordance with an exemplary embodiment. Although FIG. 2 illustrates a series of method steps, the order of particular steps may be altered and/or other steps may be omitted altogether while still attaining the same or a similar result. The detailed description of FIG. 1 may operate and apply to the method steps in FIG. 2, so that some of the detail from FIG. 1 is not repeated in the discussion of FIG. 2 for brevity.

One or more documents are prepared for scanning (step 201). For example, an envelope of mail is opened and the items in each envelope are characterized separately using separator sheets. If one envelope contains one or more client folders, each of the client folders may be further characterized using a first level separator sheet. Accordingly, any number of levels may be separated using any number of levels of separator sheets. The levels of separator sheets can identify different clients, different types of documents, or any other characterization needed to prepare the documents/mail. The opening of the envelope, characterization of the separator sheet, or other document preparation can be done manually (e.g., by a person), automatically (e.g., by a robot and character recognition system), or any combination of manual and automatic document preparation. For example, a robot can open the envelope, read the barcode on the document or separator sheet using OCR, and characterize the document or separator sheet and associated documents using the barcode.

Scanner 101 determines whether there is one or more documents to be scanned (step 203). If there is no document to be scanned, then server 105 imports the electronic document(s) (step 205) (optionally via server 103) and processing continues at step 347 in FIG. 3, as discussed below. Server 105 can simultaneously import one or more electronic documents as the below steps are being performed. For simplicity, each step is discussed separately; however, for example, server 105 may import one or more documents while steps 203-243 are being simultaneously performed.

If there is one or more documents to be scanned, then scanner 101 determines whether a separator sheet barcode exists (step 209). If a separator sheet barcode exists, then system 100 checks whether the barcode separates the level of documents (step 211), which is described below. If a separator sheet barcode does not exist, then scanner 101 sprays a document control number on the front and/or back of the electronic document (step 213). A page counter (not shown) of scanner 101 is incremented and scanner 101 scans both sides of each document (step 214). Once the document has been scanned, then the document is stored electronically in one or more of servers 103 or 105 (step 215).

Scanner 101 determines whether the electronic document is a trace coupon or a check (step 217). Scanner 101 makes this determination based on the barcode, document control number, or other document information associated with the electronic document. If the electronic document is a trace coupon or a check, then scanner 101 captures and stores the MICR data from the coupon or check (step 219). The MICR data can be read and converted using OCR technology. Scanner 101 may move the original check document to a first pocket (not shown) of scanner 101 in order to signify that the check may be processed. Scanner 101 indicates that the original check document may be processed and resumes processing at step 203.

If the electronic document is not a trace coupon or a check, then scanner 101 determines whether the electronic document is a critical extraction document (step 221). If the electronic document is a critical extraction document, then scanner 101 indicates that the critical extraction document exists and resumes processing at step 203. For example, before resuming processing at step 203, scanner 101 may move the critical extraction document to a second pocket (not shown) of scanner 101. If the electronic document is not a critical extraction document, then scanner 101 indicates that this electronic document is not a critical extraction document and resumes processing at step 203. For example, before resuming processing at step 203, scanner 101 may move the document to a third pocket (not shown) of scanner 101 (step 243).

If a separator sheet barcode exists (in step 209), then scanner 101 determines whether the barcode separates the first level of documents (step 211) to have a second level (or more) of documents. For example, a second level of documents could be per client, per company, or per business area. If the barcode does not separate the first level of documents (in step 211), then another check is completed to determine whether the barcode identifies a document, trace coupon, or critical extraction document (step 223), as described below. If the barcode separates the first level of documents, then scanner 101 determines whether a document existed before the first level of documents (step 225). For example, if a client folder contained 2 documents with the first document having 3 pages and the second document having 1 page, then the barcode would separate the first level documents (e.g., separate the 2 documents from each other). For example, a client folder separator sheet is associated with a client folder; a document separator sheet is associated with the first 3 page document; and a second document separator sheet is associated with the second 1 page document. Accordingly, scanner 101 would scan the client folder separator sheet, the first document separator sheet, the 3 page document, the second document separator sheet, and the 1 page document in order to create one client folder. If a document existed before the first level of documents, then scanner 101 indicates that this previous document(s) is ready to be imported by server 105 (step 227).

Once scanner 101 makes the indication that the previous document is ready to be imported or if a document did not exist before the first level of documents, then a document control number is assigned to a second level of documents (step 229). For example, the document control number may be configured as YYYYJJJDXNNNNNN.ZZZ.AAA, which is a unique number for the document. YYYY represents the current year (e.g., 2004), JJJ represents a Julian date, DX represents an identification for scanner 101 (or if there are multiple scanners to distinguish each scanner), NNNNNN represents a number associated with the document, ZZZ represents the second level of documents (or subsequent levels of documents), and AAA represents a particular page number within the second level of documents (or subsequent levels of documents). The document control number can be unique to the document, and various portions of the document control number can also be unique to the document. For example, the document control number of one document can be 2004814DX555555.001.002. The document control number can be used to identify the one or more levels of documents. The document control number is sprayed on the one or more documents in this second level of documents (step 231) and processing continues at step 203. Before continuing to step 203, scanner 101 may move the document to a fourth pocket (not shown) of scanner 101.

If the barcode identifies a document, trace coupon, or critical extraction document (in step 223), then a document control number is assigned to the first level of documents (step 233). The document control number is sprayed on the one or more documents (step 235).

Scanner 101 determines whether the barcode is a separator sheet for a trace coupon (step 237). If the barcode is a separator sheet for a trace coupon, then processing resumes at step 214. If the barcode is not a separator sheet for a trace coupon, then scanner 101 may move the separator sheet to a fourth pocket (not shown) of scanner 101.

If the barcode does not identify the image as a particular document, trace coupon, or critical extraction document (in step 223), then scanner 101 determines whether the barcode identifies a separator sheet that needs to be rescanned (step 239). If the barcode identifies a separator sheet that identifies documents needing to be rescanned, then the document control number is assigned to the document (step 241). For example, before continuing to step 203, scanner 101 may move the separator sheet to a third pocket (not shown) of scanner 101.

If there are no more documents to be scanned (in step 203) or simultaneous with the processing in FIG. 2, then server 105 imports the electronic document(s) (step 205) (optionally via server 103) and processing continues at step 347 in FIG. 3, as described below.

Figure 3:
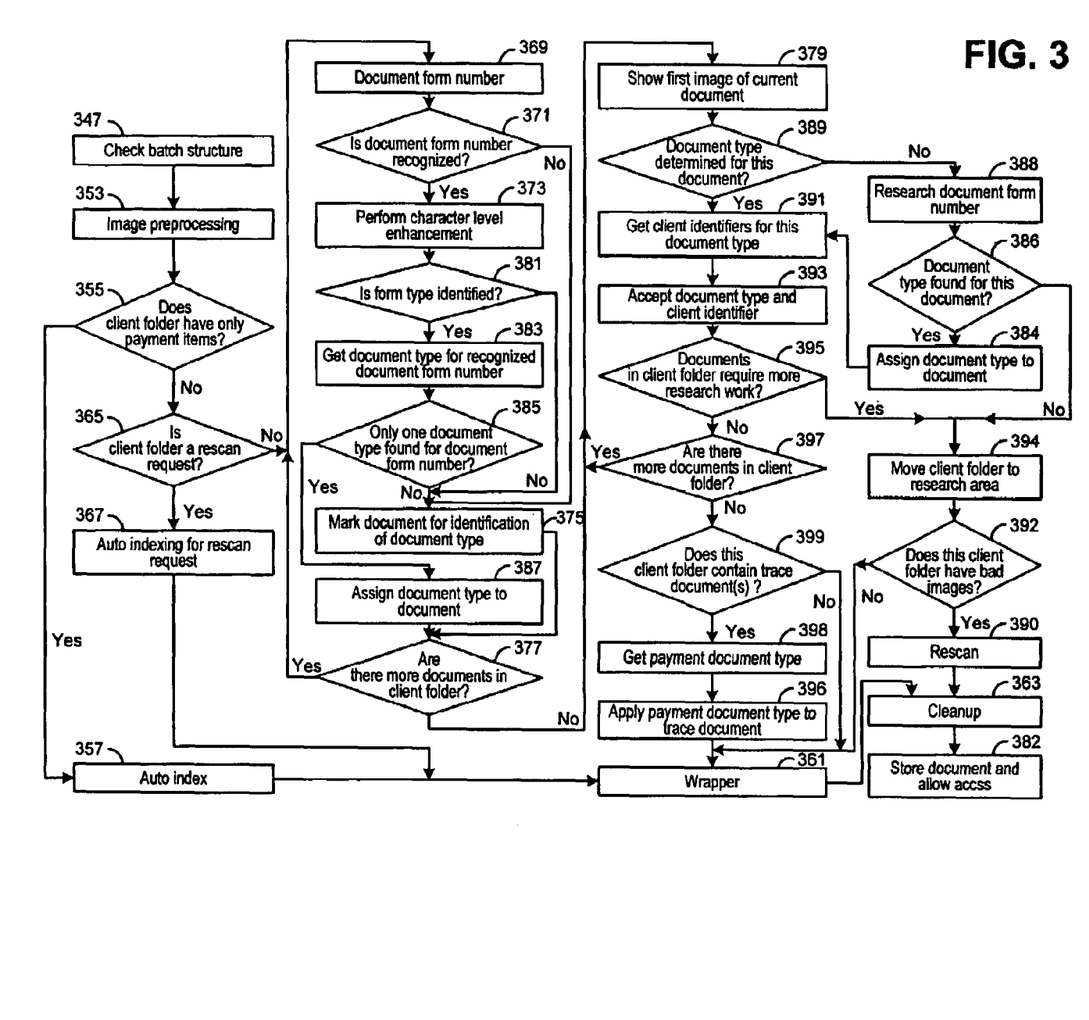
FIG. 3 is the continuation of the flowchart of FIG. 2 of a method for electronic document scanning and configuration for high speed electronic document delivery in accordance with an exemplary embodiment.

FIG. 3 is a flowchart of a method for electronic document scanning and configuration for high speed electronic document delivery (e.g., for system 100 of FIG. 1) in accordance with an exemplary embodiment of the present invention. Although FIG. 3 illustrates a series of method steps, the order of particular steps may be altered and/or other steps may be omitted altogether while still attaining the same or a similar result. The detailed description of FIG. 1 may operate and apply to the method steps in FIG. 3, so that some of the detail from FIG. 1 is purposely not repeated in the discussion of FIG. 3 for brevity. Also for brevity, FIG. 3 illustrates exemplary embodiments using mainly a document form number and a document type; however, various other document information could be substituted or used, such as the barcode, client identifier, document control number, or other document information.

As scanner 101 scans one or more documents, server 105 imports the electronic documents as in steps 203 and 205 in FIG. 2. Server 105 checks the batch structure of the electronic documents (step 347). For example, control logic (e.g., Captiva's FormWare™ software) may check for the quality of the scanned electronic document(s), whether the correct number of pages were scanned, and any other batch related processing. Server 105 performs preprocessing associated with the electronic documents (step 353). Control logic (e.g. Captiva's FormWare™ software) may further check for the quality of the scanned electronic document(s), clean-up or otherwise enhance the image of the electronic document(s), and otherwise perform preprocessing associated with the image of the electronic document(s).

Server 105 determines whether the electronic documents are only associated with payment items (e.g., checks, bills, accounts receivables) (step 355). If the electronic documents are only associated with payment items, then server 105 automatically indexes the electronic document (step 357). Indexing the electronic document includes using data associated with the document to identify the document (e.g., using data associated with the document to determine the document type). A wrapper is put around the image of the electronic document(s) and any associated data (step 361). Finally, server 105 performs any needed cleanup of the electronic document (step 363). This cleanup may include image enhancement, removal of parts of the electronic document(s) that do not need to be stored, and any other modifications or purging that system 100 may need. For example, the payment item may be processed and any unnecessary parts of the electronic document purged, so that excessive data is not stored within system 100. The electronic document is stored in one or more of servers 109, 111, or 121, so that computer systems 113 access the location and the electronic document (step 382), as discussed above in FIG. 1.

If the electronic documents are not only associated with payment items (in step 355), then server 105 determines whether the client folder is a rescan request (step 365). If the client folder is a rescan request, then automatic indexing is performed for the rescan request (step 367) and the wrapper (step 361) and cleanup (step 363) are performed.

If the client folder is not a rescan request (in step 365), then server 105 reads a document form number from the electronic document and converts the document form number into an electronic format (step 369), so that system 100 may use the document form number.

Server 105 determines whether the document form number is recognized (step 371). If the document form number is recognized, then server 105 performs character level enhancement (step 373). For example, character level enhancement using control logic (e.g., Captiva's FormWare™ software) includes OCR, image cleanup, and image enhancement. In addition, server 105 may use RecoStar™ character recognition for further character level enhancement.

If the document form number is not recognized (in step 371), then the electronic document is marked for identification of the document type (step 375). The identification can be manual or automatic. Manual and automatic processes are described herein in connection with various aspects in FIG. 1 and below and apply here as well. Server 105 determines whether there are any more documents in the client folder (step 377). If there are more documents in the client folder, then server 105 returns to step 369 to look for a document form number. If there are not any more documents in the client folder, then server 105 queues the first image of the electronic document to be ready for display or access (step 379).

Once server 105 performs character level enhancement (step 373), then server 105 determines whether the document form number identifies the electronic document type (step 381). Server 105 determines the document type for the recognized document form number (step 383). For example, control logic (e.g., Captiva's FormWare™ software) may read the document form number from the electronic document and converts the document form number into an electronic format to identify the document type. For example, a look-up table may be used to determine the document type based on the document form number. This way system 100 may use the document form number to continue processing the electronic document. Server 105 determines whether only one document type is determined for the document form number (step 385). If only one document type is determined for the document form number, then server 105 assigns the document type to the electronic document (step 387) and processing continues at step 377. If more than one document type is determined for the document form number, then processing continues at step 375.

Per above, if there are not any more documents in the client folder (in step 377), then server 105 queues the first image of the electronic document for display or access by one or more of computer systems 107 (step 379). Server 105 determines whether the document type was determined for the electronic document (step 389). If the document type was determined for the electronic document (in step 389), then computer system 107 looks for a client identifier for the document type (step 391). For example, the document form number, document type, and client identifier may be displayed on computer system 107. Computer system 107 may accept the document form number, document type, and client identifier (step 393). Computer system 107 can automatically or manually determine the document type or other identifying information. Automatically determining the document type or other document identifying information can include using OCR, the barcode, document form number, or other document information. Manually determining the document type or other document identifying information can include a person viewing the electronic document on computer system 107 and from inspection determining the document type, barcode, document form number, or other document information.

Server 105 determines whether the electronic documents in the first level of documents (e.g., client folder) require more research (step 395). If the electronic documents in the first level of documents (e.g., client folder) do not require more research, then server 105 determines whether there are anymore documents in the first level of documents (step 397). If there are more documents in the first level of documents, then processing continues at step 379. If there are not anymore documents in the first level of documents, then server 105 determines whether the first level of documents contains a trace document (step 399). If the first level of documents has a trace document, then the payment document type is determined (step 398). The payment document type is applied to the trace document (step 396) and processing continues at step 361. If the client folder does not have a trace document, then processing continues at step 361.

If the electronic documents in the first level of documents (e.g., client folder) require more research (in step 395), then server 105 queues the client folder to a research area (step 394), as discussed below. Server 105 determines whether the first level of documents has any bad images (step 392). For example, bad images can include a missing document type, missing barcode, or other missing identifying information. Bad images can also include poorly scanned documents, poor quality images, or other items affecting the image quality of the electronic document. If the first level of documents does not have any bad images, then processing continues at step 361. If the first level of documents has any bad images, then server 105 generates a report directing the rescan of any bad images of the electronic document(s) (step 390) and processing continues at step 363.

If the document type was not determined for the electronic document (in step 389), then the document type for the electronic document is researched (step 388). For example, the document type can be researched automatically or manually. Automatic research may use OCR to read the document type, barcode, or other identification information. Manual research may use a person viewing the electronic document on computer system 107 in order to attempt to determine the document type, barcode, or other identification information. Based on the research, server 105 determines whether the document type was found for the electronic document (step 386). If the document type was found for the electronic document (in step 386), then the determined document type is assigned to the electronic document (step 384) and processing continues at step 391. If the document type was not found for the electronic document (in step 386), the processing continues at step 394.

Thus, system 100 facilitates the imaging, configuration, and delivery of documents by preparing electronic documents and making the electronic documents accessible electronically to a user's computer system 113. System 100 uses scanner 101 along with various servers to scan, review, enhance, and provide access to documents electronically via a user's computer system 113.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that may direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose, hardware-based computer systems which perform the specified functions or steps, or suitable combinations of special purpose hardware and computer instructions.

As used herein, the terms "user" and "participant" may interchangeably include any person, entity, charitable organization, machine, hardware, software, or business who accesses and uses the system of the invention, including purchasers, merchants, card issuers, financial services companies, healthcare oriented companies (e.g., hospitals, health maintenance organizations, medical offices, and the like), and other systems requiring confidentiality, privacy of information, and protection of related rights. Participants in the system may interact with one another either online or off-line. It is further noted that other participants may be involved in various embodiments of the invention, such as an intermediary settlement institution, though these participants are not always described in detail.

In the foregoing specification, the invention has been described with reference to specific embodiments. Various modifications and changes may be made, however, without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element (s) that may cause any benefit, advantage, or solution to occur or become more pronounced are not to be construed as critical, required, or essential features or elements of any or all the claims. As used herein, the terms "comprises", "comprising", "includes", "including", or any other variations thereof, are intended to cover a non-exclusive inclusion, such that a process, method, article, or apparatus that comprises or includes a list of elements does not include only those elements but may include other elements not expressly listed or inherent to such process, method, article, or apparatus. Further, no element described herein is required for the practice of the invention unless expressly described as "essential" or "critical".

What is claimed is:

1. A system for facilitating document imaging and delivery, comprising:
    a scanner configured for reading a barcode from a separator sheet associated with at least one document, wherein the document includes payment information, sorting the at least one document based on the barcode, and scanning the at least one document in order to create an electronic document;
    a server in communication with the scanner configured for:
    reading at least one of the barcode, a document form number, a document control number, and identification information from the electronic document;
    assigning at least one of a document form number, a document control number, and identification information to the electronic document;
    determining at least one of a document type and identification information of the electronic document based on at least one of the barcode, the document form number, the document control number, and identification information; and
    determining if the electronic document includes non-payment information;
    associating the electronic document with a rescan request if the document includes the non-payment information;
    indexing the electronic document using at least one of the barcode, the document form number, the document control number, identification information, and the document type;
    rescan indexing the electronic document if the electronic document is associated with a rescan request using at least one of the barcode, the document form number, the document control number, identification information, and the document type;
    determining if the electronic document includes unnecessary information that does not require storing;
    removing the unnecessary information from the electronic document;
    a communication channel, in communication with at least one of the scanner, the server, and at least one computer system, configured for delivering the location of the electronic document electronically to the at least one computer system based on at least one of the barcode, the document form number, the document control number, identification information, and the document type.

2. The system of claim 1, wherein delivering the location of the electronic document to the at least one computer system includes using a Uniform Resource Locator to locate the electronic document.

3. The system of claim 1, wherein the scanner is configured to perform at least one of the following:
    sort the at least one document into one or more pockets of the scanner based on at least one of the barcode, the document form number, the document control number, identification information, and the document type;
    determine whether there is more than one level of a separator sheet for the document;
    determine whether the electronic document is a trace coupon or a check;
    capture the MICR data if the electronic document is a trace coupon or a check;

determine whether the electronic document is a critical extraction document; and enhance the image quality of the electronic document.

4. The system of claim 1, wherein the server includes a plurality of servers.

5. The system of claim 1, wherein the server is configured to perform at least one of the following:

capture the MICR data if the electronic document is a trace coupon or a check;

enhance the image quality of the electronic document; and store the electronic document in one or more databases.

6. The system of claim 1, wherein the server is configured to read at least one of the document form number and identification information and translate at least one of the document form number and identification information into a document type.

7. The system of claim 6, wherein translating the document form number into a document type includes using a look-up table.

8. The system of claim 6, wherein if the server cannot determine at least one of a document form number and a document type, then a second server in communication with the server is configured to determine at least one of a document form number and a document type using the identification information.

9. The system of claim 1, wherein a second server in communication with the server is configured to locate the electronic document using a Uniform Resource Locator.

10. The system of claim 1, wherein a second server in communication with the server is configured to store a number of electronic documents to produce a client folder.

11. The system of claim 10, wherein the client folder includes at least one of the following separator sheets:

client folder separator sheet;
document separator sheet;
payment separator sheet;
trace document separator sheet;
critical extraction document separator sheet;
critical extraction placeholder separator sheet;
RESCAN separator sheet; and
archive separator sheet.

12. The system of claim 11, wherein at least one of the separator sheets has an associated barcode as follows:

client folder separator sheet, wherein the barcode comprises FOLDER;

document separator sheet, wherein the barcode comprises DOCUMENT;

payment separator sheet, wherein the barcode comprises PAYMENT;

trace document separator sheet, wherein the barcode comprises TD (0-9) (0-9) (0-9) (0-9) (0-9) (0-9) (0-9) (0-9) (0-9) (0-9) (0-9) (0-9) (0-9);

critical extraction document separator sheet, wherein the barcode comprises CEDOCUMENT;

critical extraction placeholder separator sheet, wherein the barcode comprises PLACEHOLDER;

RESCAN separator sheet, wherein the barcode comprises RESCAN; and archive separator sheet, wherein the barcode comprises ARCHIVE.

13. The system of claim 1, wherein the document control number is configured with the following format:

YYYYJJJDXNNNNNN.ZZZ.AAA, wherein YYYY represents the current year, JJJ represents a Julian date, DX represents an identification for the scanner, NNNNNN represents a number associated with the document, ZZZ represents a level associated with the document, and AAA represents a particular page number within the level associated with the document.

14. A method for facilitating document imaging and delivery, comprising the steps of:

reading a barcode from a separator sheet associated with a document, wherein the document includes payment information;

sorting the document based on the barcode;

scanning the document in order to create an electronic document;

reading at least one of the barcode, a document form number, a document control number, and identification information from the electronic document;

assigning at least one of a document form number, a document control number, and identification information to the electronic document;

determining at least one of a document type and identification information of the electronic document based on at least one of the barcode, the document form number, the document control number, and identification information;

determining if the electronic document includes non-payment information;

associating the electronic document with a rescan request if the document includes the non-payment information;

indexing the electronic document using at least one of the barcode, the document form number, the document control number, identification information, and the document type;

rescan indexing the electronic document if the electronic document is associated with a rescan request using at least one of the barcode, the document form number, the document control number, identification information, and the document type;

determining if the electronic document includes unnecessary information that does not require storing;

removing the unnecessary information from the electronic document;

delivering the location of the electronic document electronically to a computer system based on at least one of the barcode, the document form number, the document control number, identification information, and the document type.

15. The method of claim 14, further comprising at least one of the steps of:

determining whether there is more than one level of a separator sheet for the document;

reading at least one of the document form number and identification information and translating at least one of the document form number and identification information into a document type;

translating the document form number into a document type using a look-up table;

determining whether the electronic document is a trace coupon or a check;

capturing the MICR data if the electronic document is a trace coupon or a check;

determining whether the electronic document is a critical extraction document;

enhancing the image quality of the electronic document; and storing the electronic document on a server.

16. A computer-readable storage medium containing a set of instructions for facilitating document imaging and delivery for a general purpose computer comprising:

reading a barcode from a separator sheet associated with a document, wherein the document includes payment information;

sorting the document based on the barcode;

scanning the document in order to create an electronic document;

reading at least one of the barcode, a document form number, a document control number, and identification information from the electronic document;

assigning at least one of a document form number, a document control number, and identification information to the electronic document;

determining at least one of a document type and identification information of the electronic document based on at least one of the barcode, the document form number, the document control number, and identification information;

determining if the electronic document includes non-payment information;

associating the electronic document with a rescan request if the document includes the non-payment information;

indexing the electronic document using at least one of the barcode, the document form number, the document control number, identification information, and the document type;

rescan indexing the electronic document if the electronic document is associated with a rescan request using at least one of the barcode, the document form number, the document control number, identification information, and the document type;

determining if the electronic document includes unnecessary information that does not require storing;

removing the unnecessary information from the electronic document;

delivering the location of the electronic document electronically to a computer system based on at least one of the barcode, the document form number, the document control number, identification information, and the document type.

* * * * *